(12) United States Patent
Nguyen et al.

(10) Patent No.: US 6,658,836 B2
(45) Date of Patent: Dec. 9, 2003

(54) HYBRID CORD

(75) Inventors: Gia Van Nguyen, Rossignol (BE); Florence de Boisfleury, Akron, OH (US); Mustafa Goksoy, Bettendorf (LU); Robert Edward Lionetti, Bereldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 88 days.

(21) Appl. No.: 10/082,512

(22) Filed: Feb. 25, 2002

(65) Prior Publication Data

US 2002/0174645 A1 Nov. 28, 2002

Related U.S. Application Data

(60) Provisional application No. 60/275,797, filed on Mar. 14, 2001.

(51) Int. Cl.$^7$ ................................................ D07B 1/06
(52) U.S. Cl. ............................ 57/218; 57/230; 57/231
(58) Field of Search ......................... 57/210, 212, 213, 57/215, 218, 230, 231, 902; 152/556, 557

(56) References Cited

U.S. PATENT DOCUMENTS

| | | | |
|---|---|---|---|
| 1,009,030 A | 11/1911 | Frederick | |
| 3,075,344 A | 1/1963 | Fenner et al. | 57/147 |
| 3,686,855 A | 8/1972 | Faley et al. | 57/145 |
| 3,699,768 A | 10/1972 | Roberts et al. | 57/144 |
| 3,726,078 A | * 4/1973 | Nakamura | 57/221 |
| 3,758,704 A | * 9/1973 | Naud | 174/102 E |
| 3,977,174 A | 8/1976 | Boileau | 57/145 |
| 4,034,547 A | 7/1977 | Loos | 57/146 |
| 4,176,705 A | 12/1979 | Russell et al. | 152/359 |
| 4,219,995 A | 9/1980 | Tajima et al. | 57/220 |
| 4,226,078 A | 10/1980 | Ohta et al. | 57/213 |
| 4,328,852 A | * 5/1982 | Poque et al. | 152/527 |
| 4,807,680 A | 2/1989 | Weidenhaupt et al. | 152/451 |
| 4,818,631 A | * 4/1989 | Bourgois | 428/605 |
| 4,832,101 A | 5/1989 | Welter | 152/527 |
| 4,878,343 A | 11/1989 | Weidenhaupt et al. | 57/222 |
| 4,893,665 A | 1/1990 | Reuter et al. | 152/451 |
| 5,048,280 A | 9/1991 | Okamoto et al. | 57/238 |
| 5,139,874 A | 8/1992 | Starinshak et al. | 428/375 |
| 5,279,695 A | 1/1994 | Starinshak et al. | 156/296 |
| 5,436,076 A | 7/1995 | Nakata et al. | 428/377 |
| 5,551,498 A | 9/1996 | Komatsuki | 152/527 |
| 5,946,898 A | 9/1999 | Kurata et al. | 57/215 |

FOREIGN PATENT DOCUMENTS

| | | | |
|---|---|---|---|
| EP | 1033435 | 9/2000 | D07B/1/06 |
| JP | 06108386 A | * 4/1994 | D07B/1/06 |

* cited by examiner

Primary Examiner—John J. Calvert
Assistant Examiner—Shaun R Hurley
(74) Attorney, Agent, or Firm—John D. DeLong

(57) ABSTRACT

A hybrid cord is presented for use in the reinforcement of elastomers. The hybrid cord is characterized by having a core steel filament, a first layer of one or more nonmetallic filaments which are wrapped about the steel filament in the core, and a second layer of from 4 to 12 steel filaments which are wrapped about the first layer.

20 Claims, 1 Drawing Sheet

HYBRID CORD

The Applicants hereby incorporate by reference prior U.S. Provisional Application Ser. No. 60/275,797, filed on Mar. 14, 2001.

BACKGROUND OF THE INVENTION

While the present invention is subject to a wide range of applications, it particularly relates to a hybrid cord, such as can be used to reinforce elastomers. More particularly, the present invention is directed to a hybrid cord construction used to reinforce rubber articles, such as belts, hoses and tires.

In a conventional rubber article, such as a tire, the fatigue properties of the metal cord reinforcement are degraded, mainly by material fatigue due to repeated strain and fretting wear in the contact portion between the adjacent filaments. The high cord tension strongly increases the contact pressure between steel filaments. The cord bending will generate a relative movement between the filaments heavily pressed against each other, leading them to severe fretting. The best way to decrease the fretting failure from the cord construction standpoint is to reduce the contact pressure between the filaments under high tension forces. Conventionally, a rubber layer is interposed between the parallel filaments. Unfortunately, not all cords are sufficiently "open" enough to permit an adequate amount of rubber to penetrate the spaces between the filaments in the cord. Therefore, there exists a need for a cord which by its very construction the fretting wear will be reduced.

SUMMARY OF THE INVENTION

The present invention relates to a hybrid cord for the use in the reinforcement of elastomers. The hybrid cord has (A) a core steel filament;

(B) a first layer of one or more nonmetallic filaments which are wrapped about the steel filament in the core; and (C) a second layer of from 4 to 12 steel filaments which are wrapped about the first layer.

DETAILED DESCRIPTION OF THE INVENTION

Figure 1:
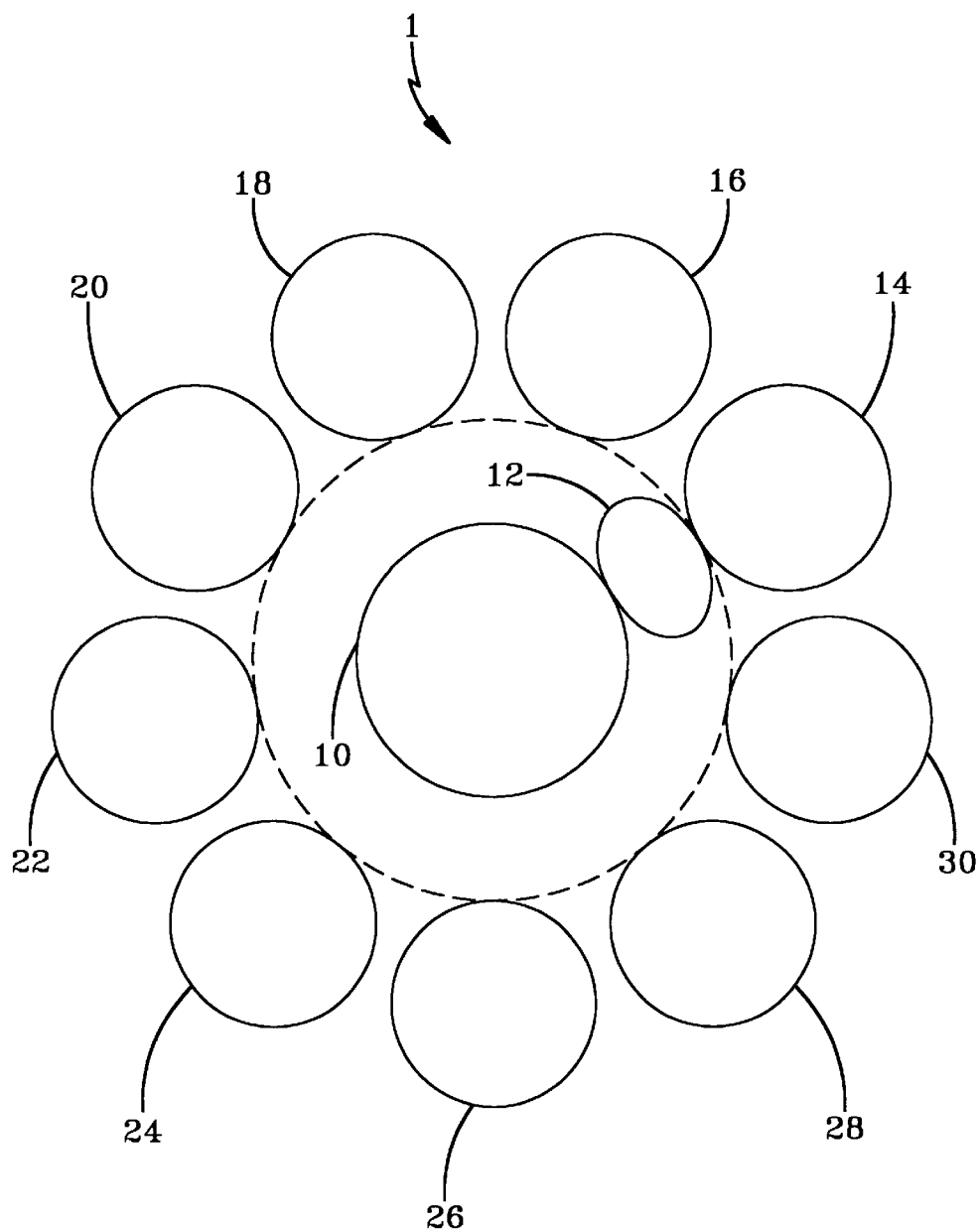
FIG. 1 is a cross-sectional view of a hybrid cord having a construction of the present invention.

The present invention will be explained in more detail referring to the accompanying drawing.

In FIG. 1, there is illustrated a hybrid cord 1 which can be used to reinforce elastomers. For example, the cord of the present invention may be considered as 1+a+b where "a" ranges from 1 to 3 nonmetallic filaments and "b" ranges from 4 to 12 steel filaments. As shown in FIG. 1, the cord is 1+1+9. However, representative examples of the various cord constructions include 1+1+4, 1+1+5, 1+1+6, 1+1+7, 1+1+8, 1+1+10, 1+1+11, 1+1+12, 1+2+4, 1+2+5, 1+2+6, 1+2+7, 1+2+8, 1+2+9, 1+2+10, 1+2+11, 1+2+12, 1+3+4, 1+3+5, 1+3+6, 1+3+7, 1+3+8, 1+3+9, 1+3+10, 1+3+11, 1+3+12.

The cord of the present invention has a core of a single steel filament 10. The core filament 10 has a diameter of "d". As used herein, "d" is a diameter ranging from 0.10 to 0.30 mm. Preferably, the diameter of the single steel filament 10 in the core ranges from 0.15 to 0.25 mm.

The single filament 10 in the core of the cord 1 is surrounded by a first layer of one or more nonmetallic filaments. In FIG. 1, a single nonmetallic filament 12 is shown. The number of nonmetallic filaments used in the first layer may range from 1 to 3 filaments. Preferably, one filament is in the first layer.

The lay length of the nonmetallic filament(s) may vary and is referred to herein as "x". The term lay length as used in connection with the nonmetallic filament 12 is the distance along the length of the core single filament 10 in which the nonmetallic filament 12 makes a complete revolution (360°) around the outside of the core filament 10. The lay length of the nonmetallic filament(s) ranges from 1 to 16 mm. Preferably, the lay length of the nonmetallic filament(s) ranges from 2 to 4 mm.

The nonmetallic filament(s) tend to deform due to the stresses between the core filament and filaments in the second layer. Obviously, the degree of deformation will depend upon the nonmetallic material used. Generally speaking, the nonmetallic material may be polyethylene, nylon, aramid or polyester. Preferably, the nonmetallic material is nylon.

Prior to formation or construction of the cord, the nonmetallic filament 12 may have various cross-sections. For example, the cross-section may be round, oval, rectangular or any other geometric shape. Preferably, the cross-section is round.

Due to the compressive nature of the nonmetallic filament, some deformation may occur. Therefore, the distance between the surface of the core steel filament and the inner surface of the second layer is equal to the gauge of the nonmetallic filaments in the first layer. The gauge of the nonmetallic filament(s) in the cord may range from 0.10 to 0.4 mm. Preferably, the gauge ranges from 0.15 to 0.30 mm.

The core filament 10 and nonmetallic filament 12 in the first layer are surrounded by a sheath or second layer of steel filaments 14, 16, 18, 20, 22, 24, 26, 28, 30. The number of filaments in the second layer may range from 4 to 12 filaments. Preferably, the number of filaments in the second layer range from 7 to 11.

The lay length of the steel filaments in the second layer may be different or equal to "x". The term lay length as used in connection with the filaments in the second layer is the distance along the length of the core single filament in which the filaments in the second layer makes a complete revolution (360° C.) around the outside of the first layer. As described above, "x" may range from 1 to 16 mm. Generally, the lay length of the steel filaments range from 3 to 16 mm. Preferably, the lay length of the steel filaments in the second layer ranges from 6 to 12 mm. In accordance with one embodiment, the lay length of the steel filaments may range from equal to up to twice the value of "x".

The diameter of the steel filaments in the second layer are equal to or different from "d". Generally speaking, the diameter of the steel filaments in the second layer ranges from 0.1 to 0.25 mm. Preferably, the diameter of the filaments in the second layer ranges from 0.12 to 0.20 mm. In accordance with one embodiment, the diameter of the steel filaments in the second layer is equal or less than "d" (diameter of the core filament).

The lay directions "Z or S" of the nonmetallic filaments and the steel filaments in the second layer may be the same or opposite. When the lay directions are opposite, the lay length of the second layer is preferably greater than the nonmetallic filament layer. In the case of the same direction, the lay length of the second layer of steel filaments is preferably double of the nonmetallic filaments.

The tensile strength of the steel filaments for use in the cord should be at least 3040 MPa–(1200×D) when D is the diameter of the filament. Preferably, the tensile strength of each filament ranges from about 3040 MPa–(1200–D) to 4400 MPa–(2000×D).

The intended use of the hybrid cord of the present invention is in a rubber reinforced article. Such articles will incorporate the cord of the present invention and will be impregnated with rubber as known to those skilled in the art. Representative examples of articles which may use the cord of the present invention include belts, hoses and tires. In the most preferred application, the cord of the present invention is used in a belt ply of a pneumatic tire or the carcass ply of a pneumatic tire.

EXAMPLE 1

A hybrid cord according to the present invention was produced having the construction 1×0.15+1×0.23+10×0.15. The core steel filament had a diameter of 0.15 mm. A first layer of a round cross-section nylon filament having a diameter of 0.23 mm was wrapped about the steel filament. A second layer of ten (10) steel filaments, each having a diameter of 0.15 mm, were wrapped about the first layer. The properties of the cord were tested and the results listed below.

| | |
|---|---|
| Breaking strength[1] | 727.5 N |
| Cable diameter | 0.665 mm |
| Lay length of first layer (mm) | 1.97 Z |
| Lay length of second layer (mm) | 8.1 S |
| Taber stiffness[2] | 832 mN-mm |

[1]ASTM D2969-00
[2]BISFA E8 determination of Taber stiffness

EXAMPLE 2

A hybrid cord according to the present invention was produced having the construction 1×0.15+1×0.23+9×0.15. The core steel filament had a diameter of 0.15 mm. A first layer of a round cross-section nylon filament having a diameter of 0.23 mm was wrapped about the steel filament. A second layer often (10) steel filaments, each having a diameter of 0.15 mm, were wrapped about the first layer. The properties of the cord were tested and the results listed below.

| | |
|---|---|
| Breaking strength[1] | 660 N |
| Cable diameter | 0.635 mm |
| Lay length of first layer (mm) | 2.1 Z |
| Lay length of second layer (mm) | 8.06 S |
| Taber stiffness[2] | 833/784 mN-mm |

[1]ASTM D2969-00
[2]BISFA E8 determination of Taber stiffness

While certain representative embodiments and details have been shown for the purpose of illustrating the invention, it will be apparent to those skilled in this art that various changes and modifications may be made therein without departing from the spirit or scope of the invention.

What is claimed is:

1. A hybrid cord characterized by
   (A) a core steel filament;
   (B) a first layer of from 1 to 3 nonmetallic filaments which are wrapped about the steel filament in the core; and
   (C) a second layer of from 4 to 12 steel filaments which are wrapped about the first layer.

2. The hybrid cord of claim 1 wherein the diameter of the core steel filament ranges from 0.10 to 0.30 mm.

3. The hybrid cord of claim 1 wherein the number of nonmetallic filaments is 1.

4. The hybrid cord of claim 1 wherein the number of steel filaments in the second layer range from 7 to 11.

5. The hybrid cord of claim 1 wherein the gauge of the nonmetallic filaments in the first layer range from 0.1 to 0.4 mm.

6. The hybrid cord of claim 1 wherein the diameter of the steel filaments in the second layer ranges from 0.10 to 0.25 mm.

7. The hybrid cord of claim 1 wherein the lay length of the nonmetallic filaments in the first layer ranges from 1 to 16 mm.

8. The hybrid cord of claim 1 wherein the lay length of the nonmetallic filaments in the first layer ranges from 2 to 4 mm.

9. The hybrid cord of claim 1 wherein the lay length of the steel filaments in the second layer range from 3 to 16 mm.

10. The hybrid cord of claim 9 wherein the lay length of the steel filaments in the second layer range from 6 to 12 mm.

11. The hybrid cord of claim 1 wherein the nonmetallic filaments are made from a synthetic polymer selected from the group consisting of polyethylene, nylon, aramid or polyester.

12. The hybrid cord of claim 1 wherein the diameters of the steel filaments in the second layer are equal to or less than the diameter of the single filament in the core.

13. The hybrid cord of claim 1 wherein the lay length of the steel filaments in the second layer is greater than the lay length of the nonmetallic filaments.

14. The hybrid cord of claim 1 when, prior to construction of the cord, the cross-section of the nonmetallic filament is round.

15. The hybrid cord of claim 1 when, prior to construction of the cord, the cross-section of the nonmetallic filament is oval.

16. An article comprising at least the cord of claim 1.

17. The article of claim 16 wherein said article is selected from the group consisting of belts, tires and hoses.

18. The article of claim 17 wherein said article is a pneumatic tire.

19. The article of claim 18 wherein said cord is used in a belt ply of said pneumatic tire.

20. The article of claim 18 wherein said cord is used in the carcass ply of said pneumatic tire.

* * * * *